(12) United States Patent
Avila (10) Patent No.: US 11,236,478 B2
(45) Date of Patent: Feb. 1, 2022

(54) TWO-HANDED SCISSOR-ACTION GRASPING IMPLEMENT

(71) Applicant: Hector Avila, Fremont, CA (US)

(72) Inventor: Hector Avila, Fremont, CA (US)

( * ) Notice: Subject to any disclaimer, the term of this patent is extended or adjusted under 35 U.S.C. 154(b) by 74 days.

(21) Appl. No.: 16/783,130

(22) Filed: Feb. 5, 2020

(65) Prior Publication Data

US 2020/0248422 A1    Aug. 6, 2020

Related U.S. Application Data

(60) Provisional application No. 62/801,517, filed on Feb. 5, 2019.

(51) Int. Cl.
    *E01H 1/12*      (2006.01)
    *B25J 1/04*      (2006.01)
    *B25J 15/00*      (2006.01)
    *B25J 18/02*      (2006.01)
    *B65D 51/24*      (2006.01)

(52) U.S. Cl.
    CPC .............. *E01H 1/1206* (2013.01); *B25J 1/04* (2013.01); *B25J 15/0028* (2013.01); *B25J 15/0033* (2013.01); *B25J 18/025* (2013.01); *B65D 51/245* (2013.01); *B65D 51/246* (2013.01)

(58) Field of Classification Search
    CPC .... A01B 1/00; A01D 7/00; A01D 7/10; E01H 1/12; E01H 1/1206; B25J 1/04
    USPC ............................... 294/50.8, 118; 56/400.12
    See application file for complete search history.

(56) References Cited

U.S. PATENT DOCUMENTS

| | | | |
|---|---|---|---|
| 4,057,277 A * | 11/1977 | Burkholder | A01B 1/18 294/50.8 |
| 4,264,095 A * | 4/1981 | Lemasters | E01H 5/02 294/53.5 |
| 4,991,386 A | 2/1991 | Dirksen | |
| 5,114,199 A | 5/1992 | Newcomer | |
| 5,564,267 A | 10/1996 | Bricker et al. | |
| 5,727,828 A * | 3/1998 | Jones | A01B 1/00 294/118 |
| D411,943 S * | 7/1999 | Beaver | D8/1 |
| 6,120,073 A | 9/2000 | Jones | |
| 6,428,067 B1 * | 8/2002 | Barragan | E04D 13/0765 15/236.04 |
| 7,306,274 B2 | 12/2007 | Renny | |

(Continued)

FOREIGN PATENT DOCUMENTS

GB      2277857 A      8/1996

*Primary Examiner* — Dean J Kramer (57) ABSTRACT

A two-handed scissor-action grasping implement has a pair of clasping paddles connected to the distal ends of a pair of arms, which are pivotally connected to each other through a central pivot. The proximal ends of the arms are pressed together in order to press the clasping paddles together in a scissoring action in order to gather debris between the clasping paddles. A plurality of protrusions connected to the clasping paddles aid in capturing debris between them. The clasping paddles are oriented at inward angles relative to the arms so that the clasping paddles are flush with each other when pressed together. A forward angle of the clasping paddles may be selected by the user through a pair of fastening mechanisms through which the clasping paddles are connected to the arms. The clasping paddles may include a specified angle at one or more corners to conform to street curbs.

13 Claims, 8 Drawing Sheets

(56) References Cited

U.S. PATENT DOCUMENTS

| | | |
|---|---|---|
| 7,661,258 B1 | 2/2010 | Petruzelli |
| 8,985,655 B2 * | 3/2015 | Kavanagh ................. B25B 7/02 |
| | | 294/118 |
| 2008/0315601 A1 * | 12/2008 | Libscomb ............. E21B 11/005 |
| | | 294/50.8 |

* cited by examiner

TWO-HANDED SCISSOR-ACTION GRASPING IMPLEMENT

The current application claims a priority to the U.S. Provisional Patent application Ser. No. 62/801,367 filed on Feb. 5, 2019.

FIELD OF THE INVENTION

The present invention relates generally to grasping implements. More particularly, the present invention relates to two-handed grasping implements for grabbing and picking up debris.

BACKGROUND OF THE INVENTION

Presently, tongs are known to the art, as are debris associated tongs. However, there is no tong presently available that is conducive to the recesses and corners that a curb, fence post corner, or similar propagate. Further, the present convention of tongs does not facilitate a readily collapsible state where further the handles may be telescoped to leverage more mechanical advantage and counterweight thereof. It is therefore the objective of the present invention to introduce a plurality of arms that support a handle thereon that may be clasped by the user, where further a plurality of clasping paddles is disposed on the opposing distal ends of the plurality of arms. Wherein the individual arms of the plurality of arms are secured about the center pivot and rotate thereon between a central axle and a plurality of bearings. Further, the plurality of clasping paddles introduces a plurality of slots and cleats that permits debris to further entrain with the plurality of clasping paddles. Further still, the plurality of arms introduces an optional hinge on the individual arm that permits the arm to fold upon itself, reducing the collapsible state of the present invention. Further, the plurality of clasping paddles comprises a preferably rectilinear profile that is conducive to exacting debris from corners and confined angular spaces. Thus, the present invention addresses a tongs-styled apparatus that facilitates gathering and removal of debris from constrained areas alongside facilitating a collapsible state through the optional hinge while accommodating a telescoping handle that permits the present invention to be wielded with a higher mechanical advantage.

Additional advantages of the invention will be set forth in part in the description which follows, and in part will be obvious from the description, or may be learned by practice of the invention. Additional advantages of the invention may be realized and attained by means of the instrumentalities and combinations particularly pointed out in the detailed description of the invention section. Further benefits and advantages of the embodiments of the invention will become apparent from consideration of the following detailed description given with reference to the accompanying drawings, which specify and show preferred embodiments of the present invention.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

The present invention is a two-handed scissor-action grasping implement. The present invention enables a user to gather debris from the ground from a standing position, which is beneficial to users with back injuries or similar issues, and beneficial for avoiding strain on the back in general while gathering debris, doing yard work, or performing similar tasks.

Figure 1:
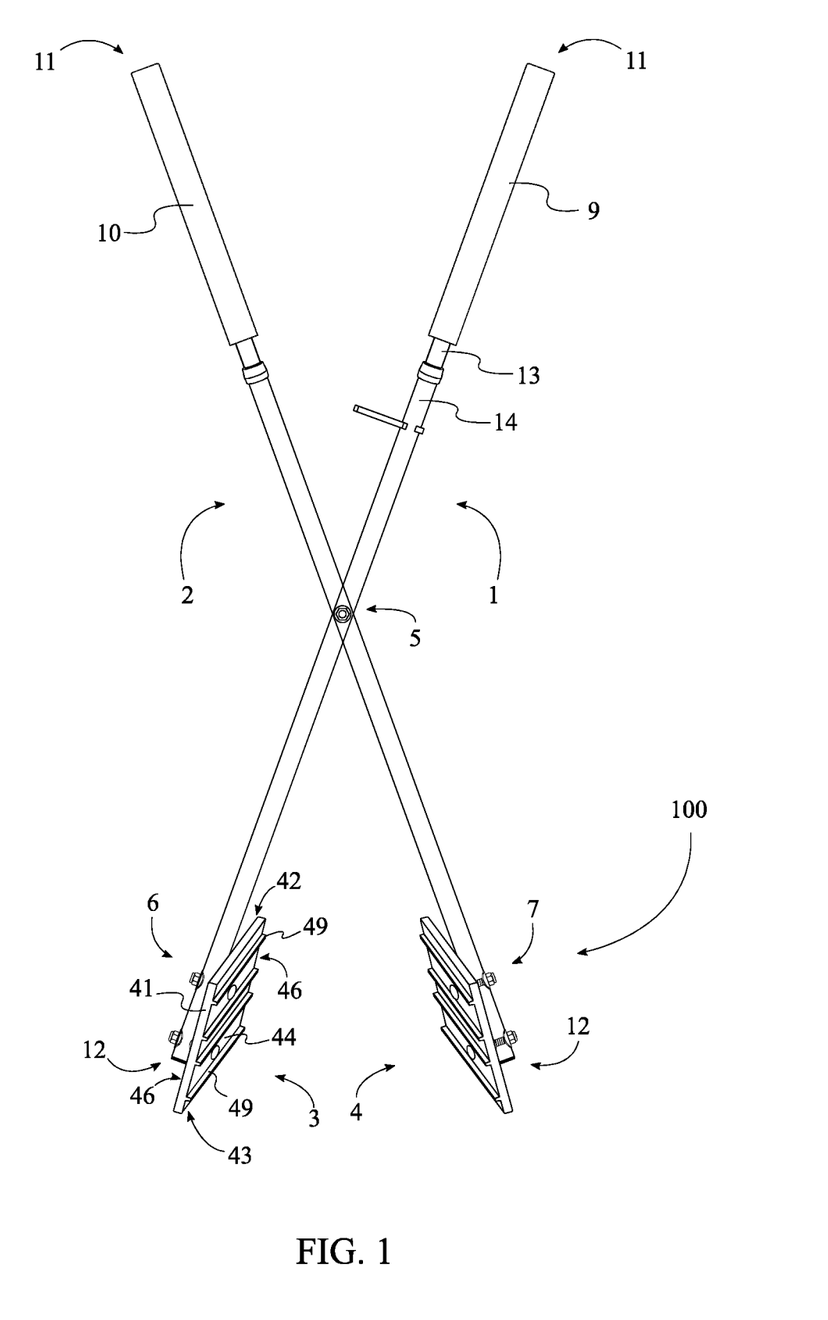
FIG. 1 is a front view of the present invention in an opened position.
Figure 2:
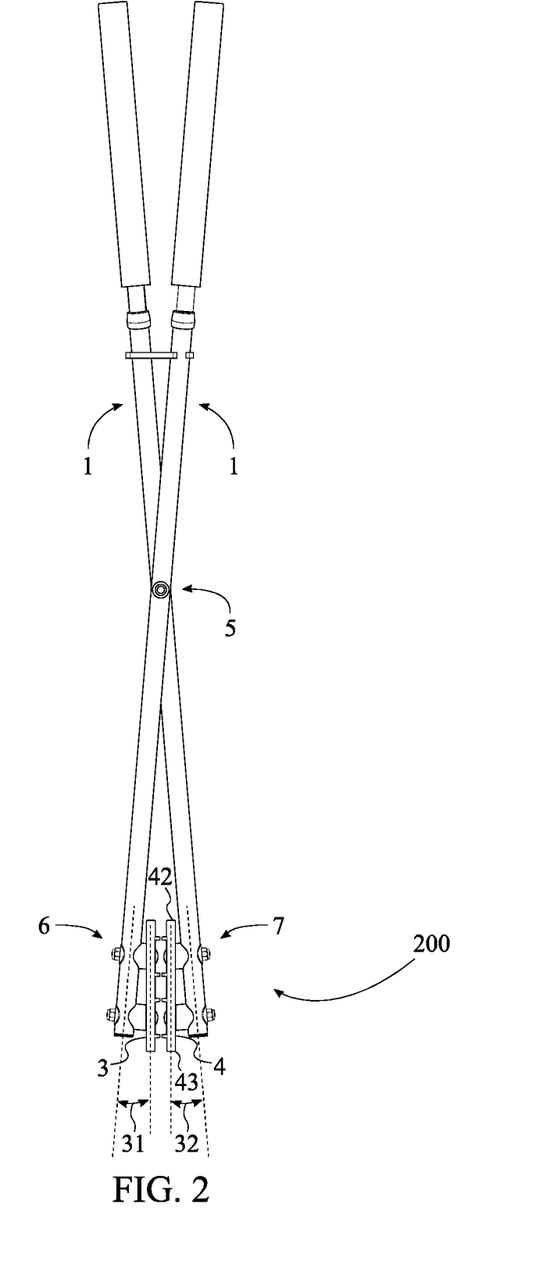
FIG. 2 is a front view of the present invention in a clasping position.

In general, referring to FIGS. 1-2, the present invention comprises a first arm 1, a second arm 2, a first clasping paddle 3, and a second clasping paddle 4. The first arm 1 and the second arm 2 each extend between a proximal end 11 and a distal end 12, and preferably have cylindrical geometry, though this is not necessarily considered to be a requirement and the first arm 1 and second arm 2 may have alternate cross-sectional geometries, such as, but not limited to, rectilinear. In the preferred embodiment, the first clasping paddle 3 and the second clasping paddle 4 each have generally planar geometry. The first clasping paddle 3 is connected adjacent to the distal end 12 of the first arm 1, and the second clasping paddle 4 is connected adjacent to the distal end 12 of the second arm 2. The first arm 1 and the second arm 2 are pivotally connected to each other between the proximal end 11 and the distal end 12 through a central pivot 5, wherein the first arm 1 and the second arm 2 are configured to rotate about the central pivot 5 between an open position 100 and a clasping position 200, and wherein the first clasping paddle 3 and the second clasping paddle 4 are pressed against each other in the clasping position 200. Preferably, the central pivot 5 is located approximately halfway between the proximal end 11 and the distal end 12 of the arms, through this is not a specific requirement in all embodiments of the present invention.

Figure 3:
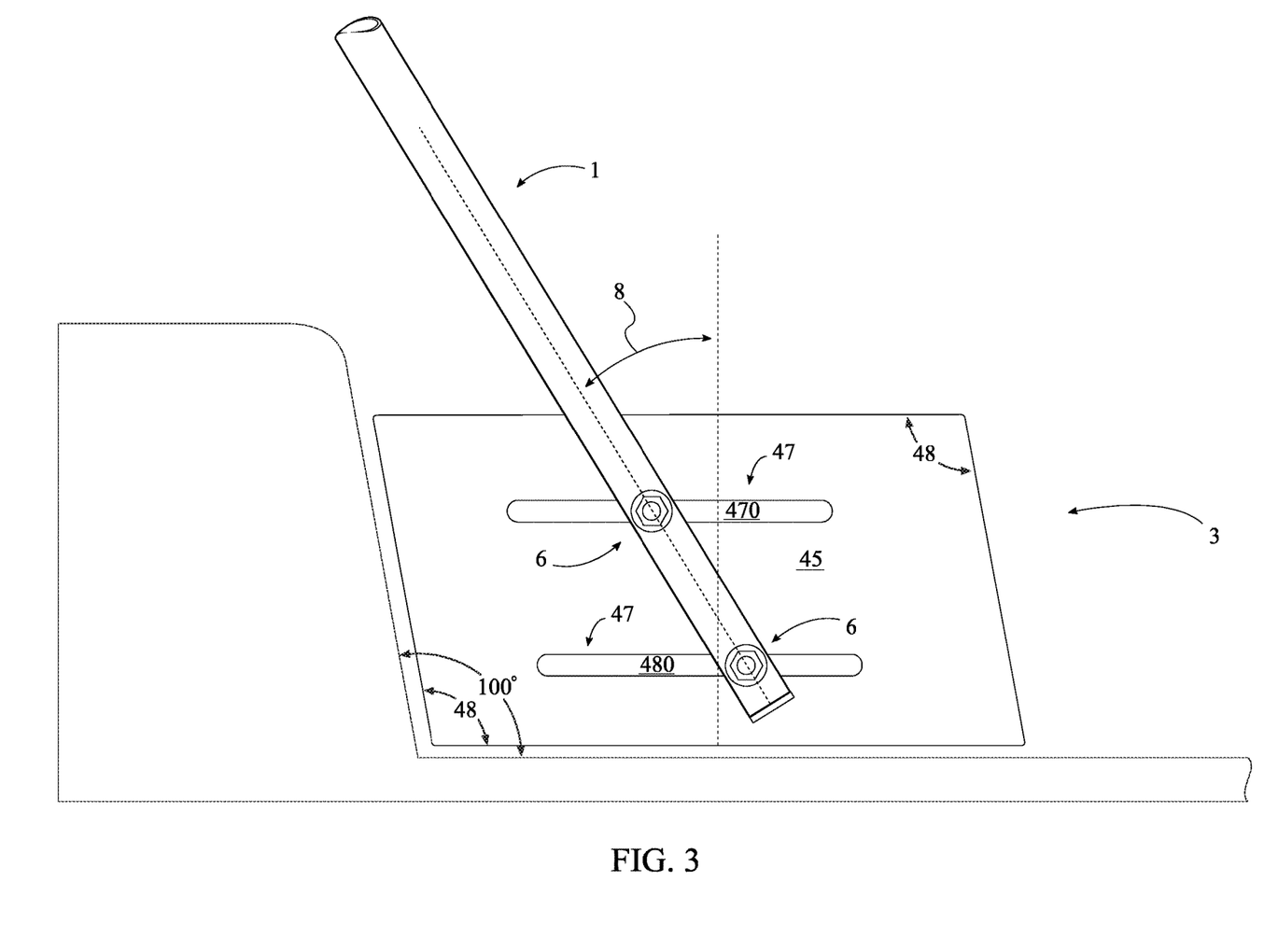
FIG. 3 is a side detail view of one of the clasping paddles illustrating the 100-degree angle of the plate body according to some embodiments.

In the preferred embodiment of the present invention, the first clasping paddle 3 is adjustably connected to the first arm 1 through a first fastening mechanism 6, wherein the first fastening mechanism 6 is configured to adjust a forward paddle angle 8 of the first clasping paddle 3 relative to the first arm 1, as shown in FIG. 3. Similarly, the second clasping paddle 4 is adjustably connected to the second arm 2 through a second fastening mechanism 7, wherein the second fastening mechanism 7 is configured to adjust a forward paddle angle 8 of the second clasping paddle 4 relative to the second arm 2.

Assuming a user grasping the proximal ends 11 of the arms, adjustment of the forward paddle angle 8 of a clasping paddle corresponds approximately to rotating the clasping paddle in a plane parallel to or similar to a saggital plane of the user; alternatively stated, the clasping paddles may be rotated forward or backward relative to the user, in a plane corresponding to the planar geometry of the clasping paddles.

In some embodiments, the present invention may further comprise a first handle 9 and a second handle 10. The first handle 9 is connected adjacent to the proximal end 11 of the first arm 1, and the second handle 10 is connected adjacent to the proximal end 11 of the second arm 2. The first handle 9 and the second handle 10 may simply be rubberized or otherwise frictional sleeves or coatings connected to the arms, or the first handle 9 and second handle 10 may comprise additional components and geometry not specified herein.

In some embodiments, the first arm 1 and the second arm 2 each comprise a first arm portion 13 and a second arm portion 14 that are telescopically engaged with each other, enabling the user to adjust the overall length of the first arm 1 and the second arm 2. The telescoping mechanism may include a locking means, such as, but not limited to, one or more pins that may be affixed within one or more holes in the arms in order to affix the arms together in a desired relative position. In some embodiments, the telescoping means is positioned near the proximal ends 11 of the arms; thus, the proximal end 11 is positioned on the first arm portion 13, and the central pivot 5 is positioned between the distal end 12 and the first arm portion 13 for each of the first arm 1 and second arm 2. In other embodiments, the telescoping means may be located elsewhere along the length of the arms.

Figure 4:
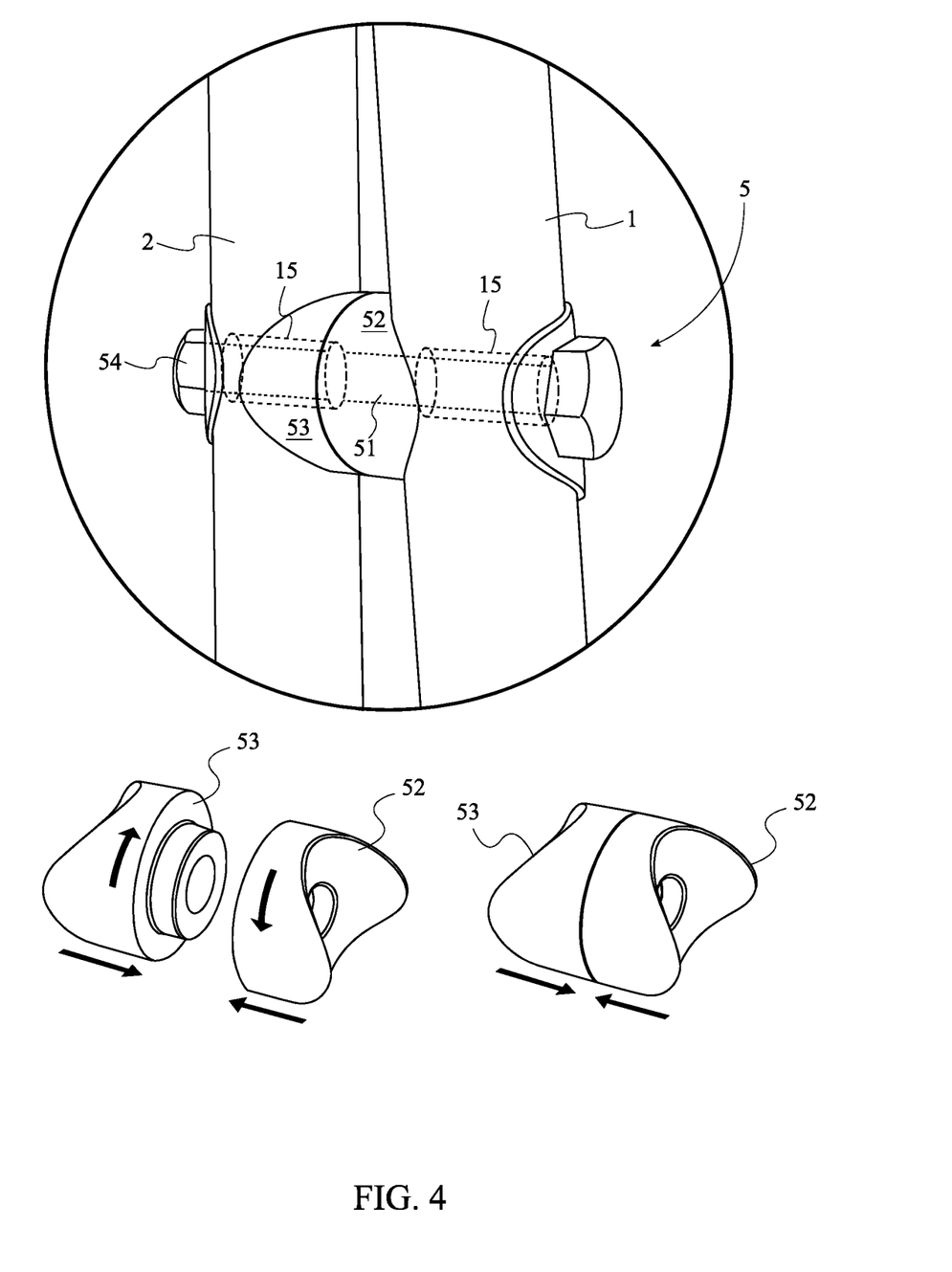
FIG. 4 is a detail view of the central pivot.

It is contemplated that the specific means through which the central pivot 5 is enabled may vary. However, referring to FIG. 4, in the preferred embodiment, the central pivot 5 comprises a pivot axle 51, a first bearing portion 52 a second bearing portion 53, and a fastener 54, while the first arm 1 and the second arm 2 each comprise a first through hole 15. The first bearing portion 52 is positioned concentrically with the first through hole 15 of the first arm 1, and the second bearing portion 53 is positioned concentrically with the first through hole 15 of the second arm 2. The first bearing portion 52 and the second bearing portion 53 are positioned concentrically with and adjacent to each other, wherein the first bearing portion 52 and the second bearing portion 53 are configured to rotate concentrically relative to each other in order to minimize friction between the first arm 1 and the second arm 2 during any pivoting action. The pivot axle 51 traverses through the first through hole 15 of the first arm 1, the first bearing portion 52, the second bearing portion 53, and the first through hole 15 of the second arm 2, and the fastener 54 is terminally fastened to the pivot axle 51. In some embodiments, the pivot axle 51 may be a threaded bolt, while the fastener 54 is a nut is tightened onto the exposed end of the threaded bolt in order to pivotally affix the first arm 1, the first bearing portion 52, the second bearing portion 53, and the second arm 2 together. Furthermore, the pivot axle 51 may be supported at either end by double sided saddle washers against the first arm 1 and second arm 2. In the preferred embodiment, the first arm 1 and the second arm 2 have cylindrical geometry, though this is not a requirement in all embodiments. As such, to accommodate for the rounded exterior surface which presents a less than ideal mating surface for the ends of the pivot axle 51, the saddle washers may be included, which are formed into a curvilinear "saddle" shape in order to accommodate the rounded exterior geometry of the arms. The saddle washers act to improve friction between the bolt head of the pivot axle 51 and the first arm 1, and the nut fastener 54 and the second arm 2.

It should be understood herein that the clasping paddles may vary in geometry and structure in different embodiments. However, in the preferred embodiment, the first clasping paddle 3 and the second clasping paddle 4 each comprise a plate body 41, a proximal edge 42, a distal edge 43, a clasping surface 44, an outer surface 45, a pair of lateral edges, and a plurality of through holes.

The outer surface 45 of the first clasping paddle 3 is positioned between the first arm 1 and the clasping surface 44 of the first clasping paddle 3; similarly, the outer surface 45 of the second clasping paddle 4 is positioned between the second arm 2 and the clasping surface 44 of the second clasping paddle 4. When the user utilizes the present invention to grasp debris or other objects, the user presses the proximal ends 11 of the arms together, which, due to the central pivot 5, results in the clasping paddles being brought together, and debris or other objects may be caught between the clasping surfaces 44 of the clasping paddles.

The plate body 41 is delineated by the proximal edge 42, the distal edge 43, and the pair of lateral edges, the proximal edge 42 is positioned between the distal edge 43 and the central pivot 5, and each of the plurality of through holes traverse through the plate body 41 for each of the first clasping paddle 3 and second clasping paddle 4. Preferably, the proximal edge 42 and the distal edge 43 are oriented parallel to each other, though this is not a strict requirement. The plurality of through holes enables attachment of the clasping paddles to the arms and adjustment of the forward paddle angle 8 thereof through the first fastening mechanism 6 and the second fastening mechanism 7, which are described further hereinafter.

In some embodiments, the plate body 41 is a parallelogram. More specifically, in some embodiments, the plate body 41 is a parallelogram comprising a pair of opposing 100-degree angles 48, as seen in FIG. 3. The purpose of the 100-degree angles 48 is to enable the plate body 41 to conform closely to the vertical edge of a street curb, which typically have a 100-degree angle to the adjacent street or other ground surface. Thus, when a user utilizes the present invention to clear debris from a street curb by placing one of the 100-degree corners of one of the clasping paddles against the lower corner of the street curb and pushing along the length of the curb, the amount of debris that slips between the clasping paddle and the curb is minimized. In general, it may be understood that the geometry of the first clasping paddle 3 and the second clasping paddle 4 may vary as desired in various embodiments without departing from the spirit and scope of the present invention.

In some embodiments, as shown in FIG. 1, the first clasping paddle 3 and the second clasping paddle 4 each further comprise a plurality of protrusions 49 that are connected to and distributed across the clasping surface 44 of the plate body 41 for each of the first clasping paddle 3 and the second clasping paddle 4. The plurality of protrusions 49 aids in capturing debris against the clasping surface 44 of the clasping paddles. In some embodiments, each of the plurality of protrusions 49 extends between the pair of lateral edges, such that the plurality of protrusions 49 is a plurality of ribs. The plurality of protrusions 49 may take other forms in other embodiments, and is not limited to the plurality of ribs. For example, in some embodiments, the plurality of protrusions 49 may comprise a plurality of spikes. In some embodiments, the plurality of protrusions 49 may comprise a plurality of teeth in order to facilitate a rake-like action.

In some embodiments, as seen in FIG. 2, the proximal edge 42 of the first clasping paddle 3 is positioned between the distal edge 43 of the first clasping paddle 3 and the first arm 1, and similarly, the proximal edge 42 of the second clasping paddle 4 is positioned between the distal edge 43 of the second clasping paddle 4 and the second arm 2. Alternatively stated, the clasping paddles are oriented at an angle to the arms so that in the clasped position, the clasping paddles are oriented flush with each other. More particularly, the first clasping paddle 3 is oriented at a first inward angle 31 to the first arm 1, and the second clasping paddle 4 is oriented at a second inward angle 32 to the second arm 2. In the preferred embodiment, said inward angles are enabled through the first fastening mechanism 6 and the second fastening mechanism 7, as is disclosed hereinafter.

Figure 5:
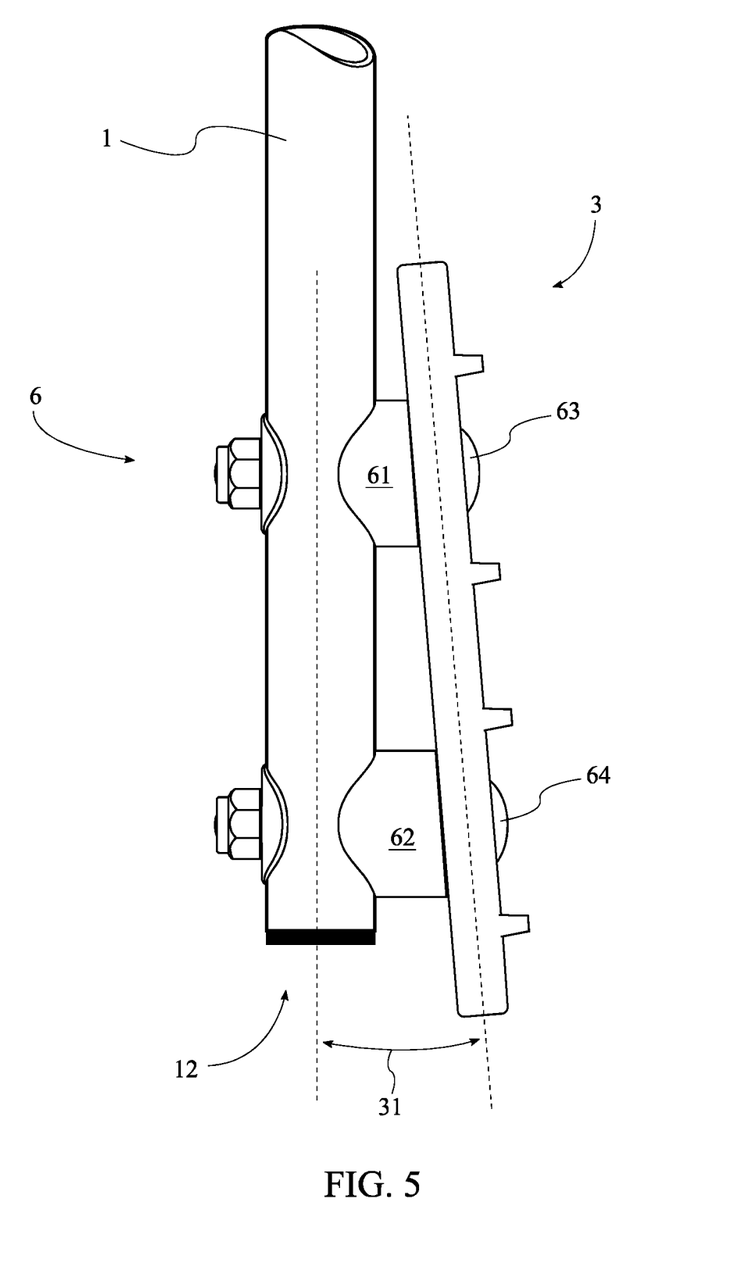
FIG. 5 is a front detail view of one of the clasping paddles.
Figure 6:
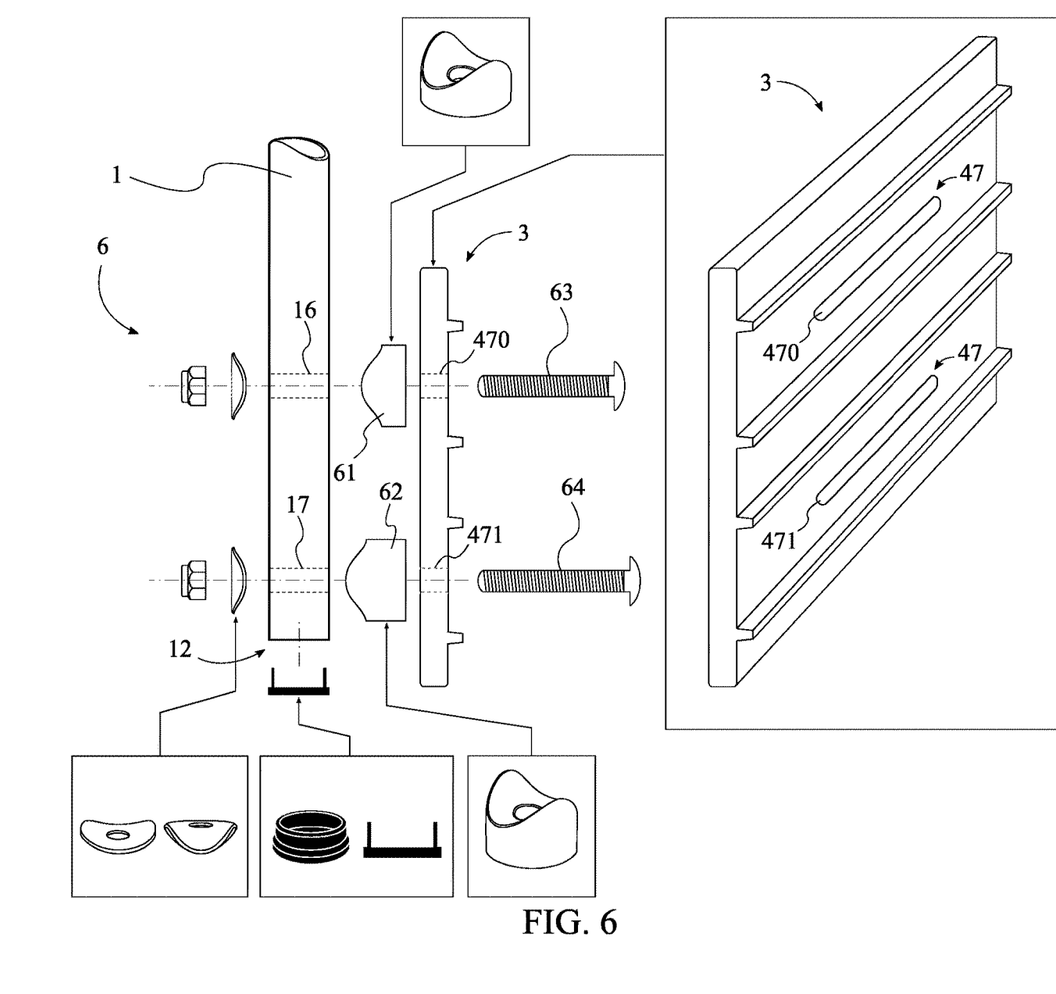
FIG. 6 is a front exploded detail view illustrating the fastening mechanism for the clasping paddles.

It should be noted that the nature and construction of the first fastening mechanism 6 and the second fastening mechanism 7 may vary for the hereinafter disclosed without departing from the spirit and scope of the present invention. However, in the preferred embodiment, referring to FIGS. 5-6, the first fastening mechanism 6 and the second fastening mechanism 7 each comprise a first spacer 61, a second spacer 62, a first fastener 63, and a second fastener 64, while the first arm 1 and the second arm 2 each further comprise a second through hole 16 and a third through hole 17. It is further noted that while FIGS. 5-6 show only the first fastening mechanism 6, the second fastening mechanism 7 may be considered to be identical. The first spacer 61 and second spacer 62 each have a paddle support end and an arm attachment end, wherein the paddle support end of each of the spacers is positioned against one of the clasping paddles, and the arm attachment end is positioned against one of the arms. As such, the paddle support end should have appropriate geometry to mate adequately with the exterior surface of the arms. More particularly, in the preferred embodiment, wherein the first arm 1 and the second arm 2 each have cylindrical geometry, the first spacer 61 and second spacer 62 are each saddle spacers, such that the arm attachment end of the saddle spacers is curved to resemble a saddle shape in order to sit flush against the exterior surface of the arms. It should be noted, however, that while this is considered a preferable implementation in the preferred embodiment, it should not be considered to be limiting, and any arrangement, construction, and geometry of the first arm 1 and second arm 2 in conjunction with the first spacer 61 and second spacer 62 may be utilized in order to achieve the intended purpose as disclosed herein.

The second through hole 16 of the first arm 1 traverses laterally through the first arm 1 adjacent to the distal end 12 of the first arm 1. The third through hole 17 of the first arm 1 traverses laterally through the first arm 1 adjacent to the second through hole 16 of the first arm 1 opposite the distal end 12 of the first arm 1. The first spacer 61 of the first fastening mechanism 6 is positioned concentrically with the second through hole 16 of the first arm 1, and the second spacer 62 of the first fastening mechanism 6 is positioned concentrically with the third through hole 17 of the first arm 1. The first fastener 63 of the first fastening mechanism 6 traverses through the first clasping paddle 3, the first spacer 61 of the first fastening mechanism 6, and the second through hole 16 of the first arm 1. The second fastener 64 of the first fastening mechanism 6 traverses through the first clasping paddle 3, the second spacer 62 of the first fastening mechanism 6, and the third through hole 17 of the first arm 1. The first fastener 63 and the second fastener 64 of the first fastening mechanism 6 may be, for example, threaded bolts, though they are not limited to such. Secondary fasteners such as threaded nuts may be affixed to the ends of the bolts in order to affix the first fastening mechanism 6 securely in place. Alternatively, the ends of the threaded nuts may screw into threaded holes positioned internally within the first arm 1.

The construction of the second fastening mechanism 7 is preferably identical to that of the first fastening mechanism 6, though this is not a requirement and the second fastening mechanism 7 may differ from the first fastening mechanism 6 if desired. In the preferred embodiment, the second through hole 16 of the first second traverses laterally through the second arm 2 adjacent to the distal end 12 of the second arm 2. The third through hole 17 of the second arm 2 traverses laterally through the second arm 2 adjacent to the second through hole 16 of the second arm 2 opposite the distal end 12 of the second arm 2. The first spacer 61 of the second fastening mechanism 7 is positioned concentrically with the second through hole 16 of the second arm 2, and the second spacer 62 of the second fastening mechanism 7 is positioned concentrically with the third through hole 17 of the second arm 2. The first fastener 63 of the second fastening mechanism 7 traverses through the second clasping paddle 4, the first spacer 61 of the second fastening mechanism 7, and the second through hole 16 of the second arm 2. The second fastener 64 of the second fastening mechanism 7 traverses through the second clasping paddle 4, the second spacer 62 of the second fastening mechanism 7, and the third through hole 17 of the second arm 2. The first fastener 63 and the second fastener 64 of the second fastening mechanism 7 may be, for example, threaded bolts, though they are not limited to such. Secondary fasteners such as threaded nuts may be affixed to the ends of the bolts in order to affix the first fastening mechanism 6 securely in place. Alternatively, the ends of the threaded nuts may screw into threaded holes positioned internally within the first arm 1.

In the preferred embodiment, for each of the first fastening mechanism 6 and the second fastening mechanism 7, the second spacer 62 has a greater axial length than the first spacer 61. Thus, the first clasping paddle 3 and the second clasping paddle 4 are held at a first inward angle 31 and a second inward angle 32, respectively, relative to the first arm 1 and the second arm 2, respectively, with the proximal edges 42 of the clasping paddles positioned closer to the arms than the distal edges 43 of the clasping paddles. It is further contemplated that in some embodiments, the first inward angle 31 and second inward angle 32 may be adjustable by the user in different embodiments; for example, the user may replace one or both of the first spacer 61 and the second spacer 62 with spacers of different length, or the inward angles may be adjustable through other means.

As previously disclosed, in the preferred embodiment, the first clasping paddle 3 and the second clasping paddle 4 each comprise a plurality of through holes. The first fastener 63 and the second fastener 64 of the first fastening mechanism 6 are removably (or permanently, in some embodiment) positioned within one of the plurality of through holes of the first clasping paddle 3. Similarly, the first fastener 63 and the second fastener 64 of the second fastening mechanism 7 are each removably positioned within one of the plurality of through holes of the second clasping paddle 4.

More particularly, in the preferred embodiment, the plurality of through holes comprises a first slot 470 and a second slot 471. The first fastener 63 of the first fastening mechanism 6 is adjustably positioned within the first slot 470 of the first clasping paddle 3, and the second fastener 64 of the first fastening mechanism 6 is adjustably positioned within the second slot 471 of the first clasping paddle 3. Similarly, the first fastener 63 of the second fastening mechanism 7 is adjustably positioned within the first slot 470 of the second clasping paddle 4, and the second fastener 64 of the second fastening mechanism 7 is adjustably positioned within the second slot 471 of the second clasping paddle 4. The relative positioning of the fasteners within the slots determines the aforementioned forward paddle angle 8 in the preferred embodiment. By changing the position of one or both of the fasteners within its respective slot, the forward angle of the plate is changed. In some embodiments, the first slot 470 and the second slot 471 are each oriented parallel to the proximal edge 42 and the distal edge 43 for each of the first clasping paddle 3 and the second clasping paddle 4, though this is not a universal requirement. In some embodiments, the first slot 470 and the second slot 471 are curved in order to facilitate the rotational geometry involved in adjusting the forward angles of the clasping paddles.

In other embodiments, instead of two slots, the plurality of through holes may comprise different arrangements of holes, cavities or other receiving elements for the fasteners. For example, in some embodiments the plurality of through holes may comprise one slot and one circular hole. In some embodiments, instead of slots, the plurality of through holes may comprise a first arrangement of holes and a second arrangement of holes, providing the user with multiple discrete angles to choose from. It is further contemplated that alternative fastening mechanisms or means may be utilized in order to attach the clasping paddles to the arms and to vary the forward angle of the plates.

Figure 7:
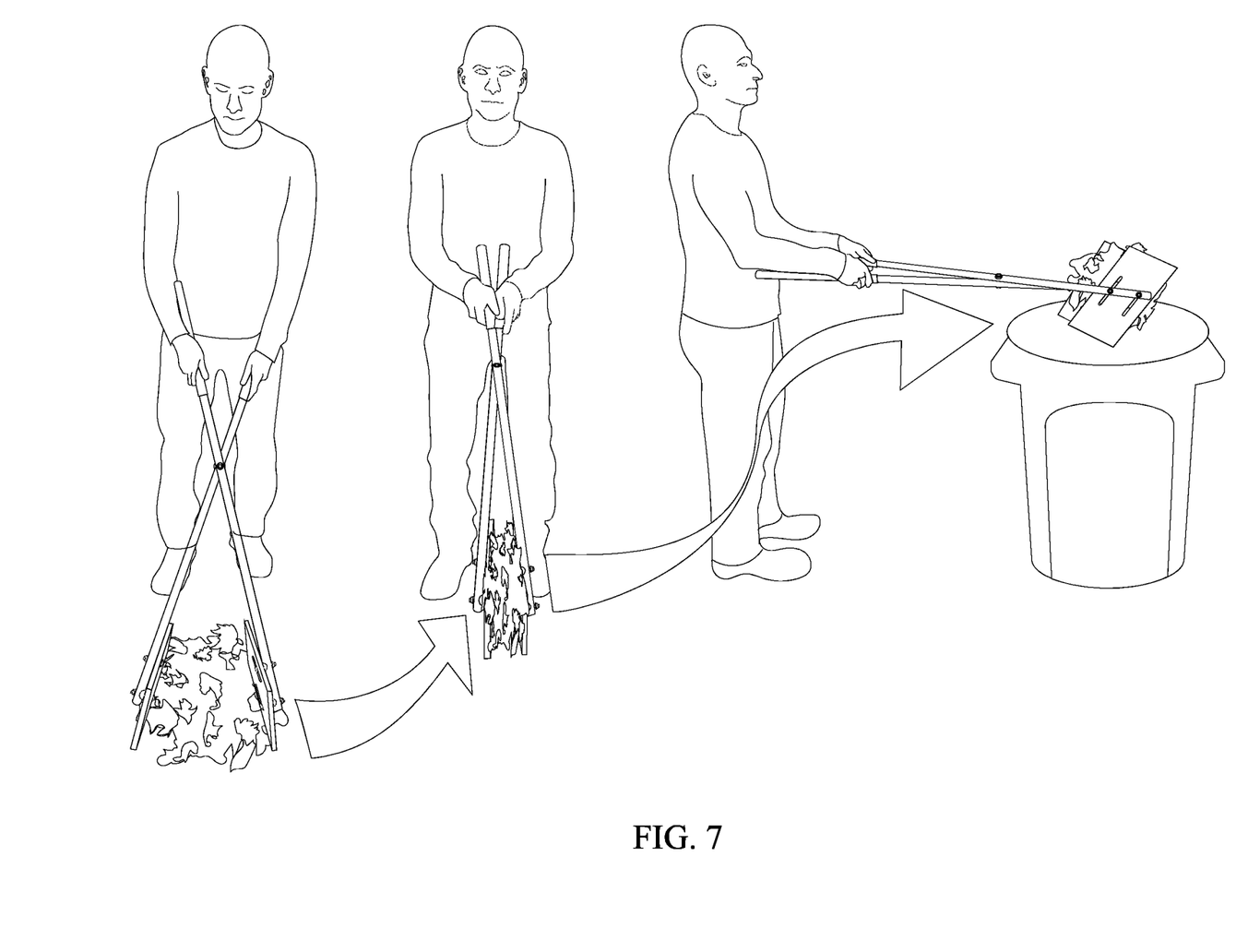
FIG. 7 is an illustration of the present invention in use to gather and dispose of debris.

Referring to FIG. 7, to utilize the present invention, a user grasps the first arm 1 and the second arm 2 in separately their hands in a location between the distal ends 12 of the arms and the central pivot 5, such as at the handles. The user may separate the clasping paddles by applying an outward force to the handles, position the clasping paddles in their opened position around a pile of debris, and then reverse the opening action by applying an inward force to the handles, causing the clasping paddles to be pressed together and the debris to be captured between them. While maintaining the inward force on the handles, the user may manipulate the clasping paddles over a trash receptacle or other desired repository location, and open the handles once more to release the debris from between the clasping paddles.

One desired feature of the present invention, it should be noted, is that while maneuvering the clasping paddles to the repository location, the user may counteract the cantilever force presented by the clasping paddles and captured debris by grasping the handles at a distance from the proximal end 11 of the arms while resting their forearms on the proximal ends 11. In this way, the user forms a class 1 lever with their hands as the fulcrum, gaining a mechanical advantage over the class 3 lever formed without the support of the user's forearm or elbow, with the user's hands as the fulcrum.

Figure 8:
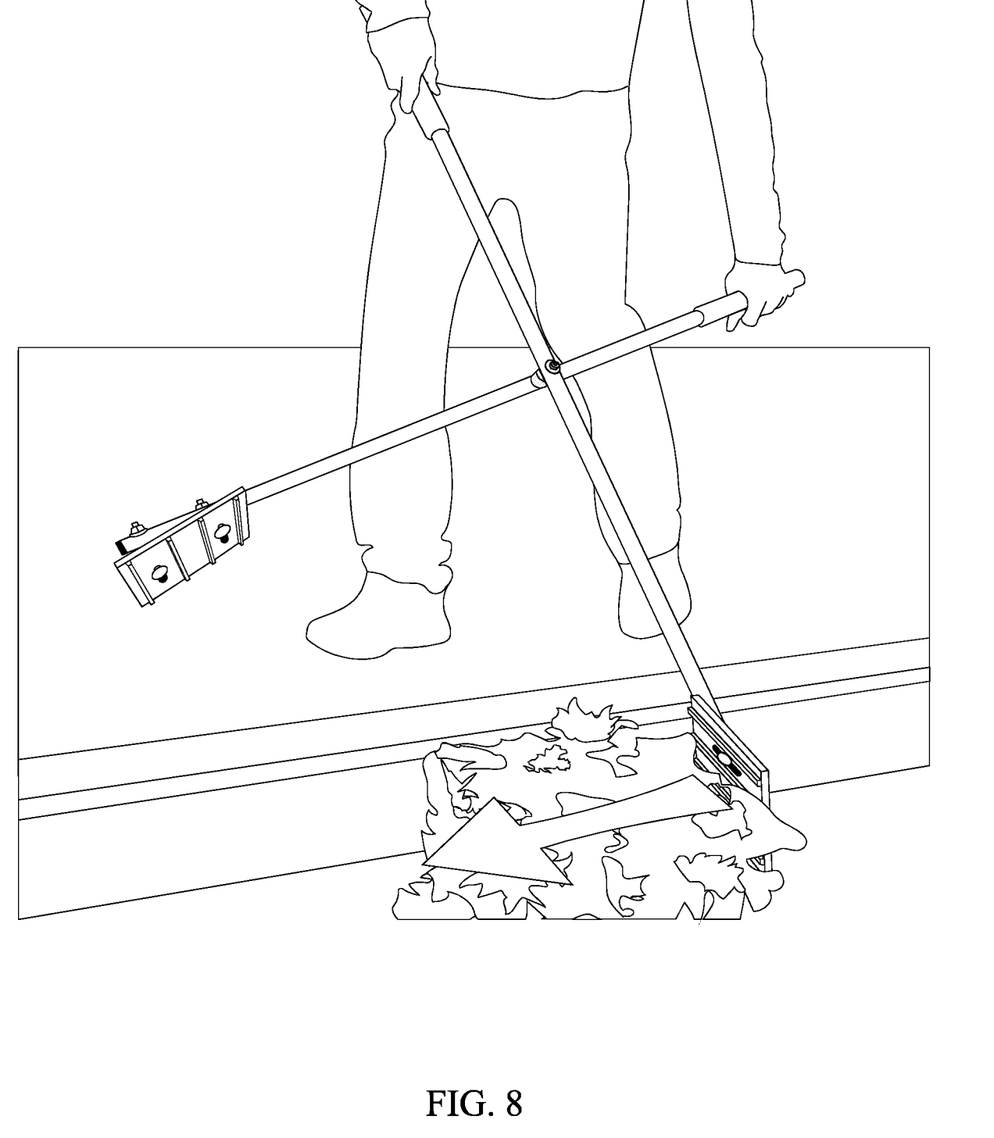
FIG. 8 is an illustration of the present invention in use to push debris along the ground.

An additional advantage of the present invention is the ability to push debris away from an area in addition to the primary clasping action. To do so, referring to FIG. 8, the user places one of the clasping paddles, for example the first clasping paddle 3, on or near the ground adjacent to the debris while holding the arms open, with the second clasping paddle 4 suspended in mid-air. In this position, the handle opposite the second clasping paddle 4 has a generally horizontal orientation, enabling the user to apply a horizontal force in order to push the first clasping paddle 3 horizontally along the ground, along with the debris.

It is further desired in the present invention to include a means of securing the first arm 1 and the second arm 2 in the closed position when not in use. It is contemplated that any desirable and suitable means to accomplish this goal may be comprised. For example, the present invention may further comprise a connecting clip with a first end and a second end, wherein the first end may be affixed to the first arm 1, while the second end may be affixed to the second arm 2. The first end of the connecting clip may be permanently affixed to the first arm 1, for example, while the second end of the connecting clip is removably attachable to the second arm 2, for example through a snap-fit connection.

Although the invention has been explained in relation to its preferred embodiment, it is to be understood that many other possible modifications and variations can be made without departing from the spirit and scope of the invention as hereinafter claimed.

What is claimed is:

1. A two-handed scissor-action grasping implement comprising:
   a first arm;
   a second arm;
   a first clasping paddle;
   a second clasping paddle;
   the first arm and the second arm each extending between a proximal end and a distal end;
   the first clasping paddle being connected adjacent to the distal end of the first arm;
   the second clasping paddle being connected adjacent to the distal end of the second arm;
   the first arm and the second arm being pivotally connected to each other between the proximal end and the distal through a central pivot, wherein the first arm and the second arm are configured to rotate about the central pivot between an open position and a clasping position, and wherein the first clasping paddle and the second clasping paddle are pressed against each other in the clasping position;
   the first clasping paddle being adjustably connected to the first arm through a first fastening mechanism, wherein the first fastening mechanism is configured to adjust a forward paddle angle of the first clasping paddle relative to the first arm; and
   the second clasping paddle being adjustably connected to the second arm through a second fastening mechanism, wherein the second fastening mechanism is configured to adjust a forward paddle angle of the second clasping paddle relative to the second arm;
   the first fastening mechanism and the second fastening mechanism each comprising a first spacer, a second spacer, a first fastener, and a second fastener;
   the first arm and the second arm each further comprising a second through hole and a third through hole;
   the second through hole of the first arm traversing laterally through the first arm adjacent to the distal end of the first arm;
   the third through hole of the first arm traversing laterally through the first arm adjacent to the second through hole of the first arm opposite the distal end of the first arm;
   the first spacer of the first fastening mechanism being concentrically positioned with the second through hole of the first arm;

the second spacer of the first fastening mechanism being concentrically positioned with the third through hole of the first arm;

the first fastener of the first fastening mechanism traversing through the first clasping paddle, the first spacer of the first fastening mechanism, and the second through hole of the first arm;

the second fastener of the first fastening mechanism traversing through the first clasping paddle, the second spacer of the first fastening mechanism, and the third through hole of the first arm;

the second through hole of the second arm traversing laterally through the second arm adjacent to the distal end of the second arm;

the third through hole of the second arm traversing laterally through the second arm adjacent to the second through hole of the second arm opposite the distal end of the first arm;

the first spacer of the second fastening mechanism being concentrically positioned with the second through hole of the second arm;

the second spacer of the second fastening mechanism being concentrically positioned with the third through hole of the second arm;

the first fastener of the second fastening mechanism traversing through the second clasping paddle, the first spacer of the second fastening mechanism, and the second through hole of the second arm;

the second fastener of the second fastening mechanism traversing through the second clasping paddle, the second spacer of the second fastening mechanism, and the third through hole of the second arm; and the second spacer having a greater axial length than the first spacer.

2. The two-handed scissor-action grasping implement as claimed in claim 1 comprising:

a first handle;

a second handle;

the first handle being connected adjacent to the proximal end of the first arm; and the second handle being connected adjacent to the proximal end of the second arm.

3. The two-handed scissor-action grasping implement as claimed in claim 1 comprising:

the first arm and the second arm each comprising a first arm portion and a second arm portion; and the first arm portion and the second arm portion being telescopically engaged with each other.

4. The two-handed scissor-action grasping implement as claimed in claim 3 comprising:

the proximal end being positioned on the first arm portion; and the central pivot being positioned between the distal end and the first arm portion.

5. The two-handed scissor-action grasping implement as claimed in claim 1 comprising:

the central pivot comprising a pivot axle, a first bearing portion, a second bearing portion, and a fastener;

the first arm and the second arm each comprising a first through hole;

the first bearing portion being positioned concentrically with the first through hole of the first arm;

the second bearing portion being positioned concentrically with the first through hole of the second arm;

the first bearing portion and the second bearing portion being positioned concentrically with and adjacent to each other, wherein the first bearing portion and the second bearing portion are configured to rotate concentrically relative to each other, wherein the first bearing portion is positioned between the first arm and the second bearing portion, and wherein the second bearing portion is positioned between the second arm and the first bearing portion;

the pivot axle traversing through the first through hole of the first arm, the first bearing portion, the second bearing portion, and the first through hole of the second arm; and the fastener being terminally fastened to the pivot axle.

6. The two-handed scissor-action grasping implement as claimed in claim 1 comprising:

the first clasping paddle and the second clasping paddle each comprising a plate body, a proximal edge, a distal edge, a clasping surface, an outer surface, a pair of lateral edges, and a plurality of through holes;

the outer surface of the first clasping paddle being positioned between the first arm and the clasping surface of the first clasping paddle;

the outer surface of the second clasping paddle being positioned between the second arm and the clasping surface of the second clasping paddle;

the plate body being delineated by the proximal edge, the distal edge, and the pair of lateral edges;

the proximal edge being positioned between the distal edge and the central pivot; and each of the plurality of through holes traversing through the plate body.

7. The two-handed scissor-action grasping implement as claimed in claim 6 comprising:

the plate body being a parallelogram.

8. The two-handed scissor-action grasping implement as claimed in claim 6 comprising:

the plate body being a parallelogram comprising a pair of opposing 100-degree angles.

9. The two-handed scissor-action grasping implement as claimed in claim 6 comprising:

the first clasping paddle and the second clasping paddle each further comprising a plurality of protrusions; and the plurality of protrusions being connected to and distributed across the clasping surface.

10. The two-handed scissor-action grasping implement as claimed in claim 9 comprising:

each of the plurality of protrusions extending between the pair of lateral edges, wherein the plurality of protrusions is a plurality of ribs.

11. The two-handed scissor-action grasping implement as claimed in claim 6 comprising:

the proximal edge of the first clasping paddle being positioned between the distal edge of the first clasping paddle and the first arm; and the proximal edge of the second clasping paddle being positioned between the distal edge of the second clasping paddle and the second arm.

12. The two-handed scissor-action grasping implement as claimed in claim 1 comprising:

the first clasping paddle being oriented at a first inward angle to the first arm; and the second clasping paddle being oriented at a second inward angle to the second arm.

13. A two-handed scissor-action grasping implement comprising:

a first arm;

a second arm;

a first clasping paddle;

a second clasping paddle;

the first arm and the second arm each extending between a proximal end and a distal end;

the first clasping paddle being connected adjacent to the distal end of the first arm;

the second clasping paddle being connected adjacent to the distal end of the second arm;

the first arm and the second arm being pivotally connected to each other between the proximal end and the distal through a central pivot, wherein the first arm and the second arm are configured to rotate about the central pivot between an open position and a clasping position, and wherein the first clasping paddle and the second clasping paddle are pressed against each other in the clasping position;

the first clasping paddle being adjustably connected to the first arm through a first fastening mechanism, wherein the first fastening mechanism is configured to adjust a forward paddle angle of the first clasping paddle relative to the first arm; and the second clasping paddle being adjustably connected to the second arm through a second fastening mechanism, wherein the second fastening mechanism is configured to adjust a forward paddle angle of the second clasping paddle relative to the second arm;

the first clasping paddle and the second clasping paddle each comprising a plurality of through holes;

the first fastening mechanism and the second fastening mechanism each comprising a first fastener and a second fastener;

the first fastener and the second fastener of the first fastening mechanism being removably positioned within one of the plurality of through holes of the first clasping paddle;

the first fastener and the second fastener of the second fastening mechanism being removably positioned within one of the plurality of through holes of the second clasping paddle;

the plurality of through holes comprising a first slot and a second slot;

the first fastener of the first fastening mechanism being adjustably positioned within the first slot of the first clasping paddle;

the second fastener of the first fastening mechanism being adjustably positioned within the second slot of the first clasping paddle;

the first fastener of the second fastening mechanism being adjustably positioned within the first slot of the second clasping paddle; and the second fastener of the second fastening mechanism being adjustably positioned within the second slot of the second clasping paddle.

* * * * *

UNITED STATES PATENT AND TRADEMARK OFFICE
CERTIFICATE OF CORRECTION

| | |
|---|---|
| PATENT NO. | : 11,236,478 B2 |
| APPLICATION NO. | : 16/783130 |
| DATED | : February 1, 2022 |
| INVENTOR(S) | : Hector Avila |

It is certified that error appears in the above-identified patent and that said Letters Patent is hereby corrected as shown below:

On the Title Page

Item (60), under the heading Related U.S. Application Data, reads:
"Provisional application No. 62/801,517, filed on Feb. 5, 2019"
Should read:
--Provisional application No. 62/801,367, filed on Feb. 5, 2019--

Signed and Sealed this
Thirteenth Day of December, 2022

Katherine Kelly Vidal
*Director of the United States Patent and Trademark Office*